United States Patent [19]

Richardson

[11] 4,089,981
[45] May 16, 1978

[54] FIBROUS SIMULATED FOOD PRODUCT WITH GEL STRUCTURE

[75] Inventor: Terence W. Richardson, Oakland, Calif.

[73] Assignee: Maxfibe Foods, Inc., Palm Desert, Calif.

[21] Appl. No.: 693,094

[22] Filed: Jun. 4, 1976

[51] Int. Cl.² ............................................. A23L 1/04
[52] U.S. Cl. .................................... 426/104; 426/574; 426/658; 426/575; 426/576; 426/577; 426/578; 426/601; 426/804
[58] Field of Search ............... 426/104, 574, 601, 614, 426/613, 658, 575, 576, 577, 578, 804, 573

[56] References Cited

U.S. PATENT DOCUMENTS

| | | | |
|---|---|---|---|
| 3,429,711 | 2/1969 | Billerbeck et al. | 426/578 |
| 3,574,634 | 4/1971 | Singer | 426/804 X |
| 3,623,885 | 11/1971 | Hamdy | 426/104 X |
| 3,676,150 | 7/1972 | Glicksman et al. | 426/804 X |
| 3,692,531 | 9/1972 | Heusdens et al. | 426/578 |
| 3,867,560 | 2/1975 | Menzi et al. | 426/804 X |
| 3,881,024 | 4/1975 | Pahoundis et al. | 426/578 |
| 3,911,159 | 10/1975 | Heusdens | 426/656 X |

Primary Examiner—Raymond N. Jones
Assistant Examiner—Esther M. Kepplinger
Attorney, Agent, or Firm—Theodore J. Long; Harry C. Engstrom; Nicholas J. Seay

[57] ABSTRACT

Simulated solid consistency cohesive food products are provided by incorporating flavoring, coloring, and texturizing agents with a low calorie oleaginous fibrous food base composition. The base composition comprises a mixture of edible oil, water and particulate fibrous cellulose combined with a cohesive gelling agent to provide a product having a cohesive gel structure. Nongelling edible gums may be mixed therewith to provide desired textural characteristics. The base composition may be produced by mixing an edible gum and a gelling agent with water, mixing an oil and emulsifier therewith, uniformly mixing particulate fibrous cellulose throughout the mass of the binding mixture, with flavoring, coloring, and texturizing agents being added as desired, and subjecting the mixture to conditions under which it sets to form a supporting cohesive gel structure.

29 Claims, No Drawings

FIBROUS SIMULATED FOOD PRODUCT WITH GEL STRUCTURE

CROSS REFERENCE TO RELATED APPLICATION

The present application is related to United States patent application Ser. No. 663,498, filed Mar. 3, 1976, and entitled "Oleaginous Fibrous Simulated Food Product".

BACKGROUND OF THE INVENTION

1. Field of the Invention

This invention pertains generally to simulated foods and to methods of making such foods; and more particularly to an oleaginous fibrous simulated food product having a supporting cohesive gel structure, and method of producing such food product.

2. Description of the Prior Art

There is an obvious and long-felt need in the United States and other developed nations of the world for foods which will satisfy a consumer's hunger but which have highly reduced caloric content and which have very low or no saturated fat and cholesterol. The high incidence of overweight among the populations of western countries is indicative of the overuse of high caloric content foods in these countries. Moreover, many of the ailments which afflict people living in the more advanced countries have been related by researchers to the "modern" diets consumed by the people in these countries. One well known example of a disease which has been related to diet is coronary arteriosclerosis, commonly considered to be partially due to the intake of excessive cholesterol and saturated fat. However, there has been growing evidence that modern diets which contain little or no dietary fiber may contribute to a variety of major and minor ailments, including constipation and colon cancer, and also possibly to a lesser extent, obesity, varicose veins, diverticulosis, and heart disease. See e.g., David Ruben, M.D., The Save-Your-Life Diet, Random House, New York, 1975. The natural indigestible fiber or roughage contained in natural foods consists primarily of cellulose, hemicellulose, lignins, pectins, and small traces of other substances, with cellulose being the major constituent. Although these natural fibers are virtually indigestible, they are becoming generally recognized as an essential component of proper nutrition, with suggested daily dietary fiber requirements being in the range of 20–40 gms. or more.

Because of the great desirability of increasing the fiber content of foodstuffs, both to decrease caloric content and to obtain the beneficial properties of fiber, attempts have been made to add refined fibrous cellulose to food compositions. Since refined fibrous cellulose is similar in feel and appearance to flour, this type of cellulose has been used as a bulking agent in farinaceous foods such as breads, pastas and other flour based products. The percentage of the fibrous cellulose versus other food components which can be used in such farinaceous foods has been limited if a product having a desirable texture and body is to be obtained. Moreover, previous food products containing fibrous cellulose have been found somewhat objectionable because of the mouth feel of the cellulose particles.

Soluble cellulose derivatives such as cellulose ether and gums and cellulose crystallite aggregates have been added to food products and are widely used as stabilizers and texture enhancers for natural food materials. However, the use of these cellulose derivatives has been limited to only very small percentages in relation to the weight of the overall food product, in the range of 1 – 2% or less, and attempts to use such cellulose derivatives as bulking agents in substantial quantities have been generally unsuccessful because of the unpalatability of the resulting product.

It is apparent that the primary requisite of a fiber enhanced natural or simulated food is palatability to the consumer, with the simulated food preferably being as close as possible in taste and texture to a common natural food.

SUMMARY OF THE INVENTION

The simulated or synthetic food products of my invention contain large amounts of cellulosic fibers, but are nonetheless palatable to the consumer. The high concentration of fibrous cellulose in the simulated food products of my invention allows such products to supplement the necessary ration of such fibers in a well balanced diet, and it is provided in a form which can simulate shape retaining, sliceable natural food products, and thus be readily acceptable to the consumer. Such products are low in calories because of the high proportion of cellulose fibers in relation to digestible food material, thus allowing substantial satiation of appetite without the intake of excess and unneeded calories.

A base food product in accordance with my invention comprises separated fibrous cellulose particles uniformly intermixed within a binding mixture. The binding mixture is formed as a mixture of a colloidal suspension of a natural edible oil and a gelling agent or gum in water, with non-gel forming gums being optionally utilized to obtain the beneficial effects of these additional gums in the final composition. The binding mixture, after setting of the gelling agent, provides a cohesive structural network gel in which the cellulose particles are dispersed and supported. This base material has a smooth cohesive consistency and bland flavor, with the flavor and texture of the final product being primarily determined by flavor additives and texturizers that are added to the base material before setting of the gelling agent. Colored and flavored portions of the gelled base product can be interspersed with or dispersed in a carrier of base product which is colored and flavored differently, thus allowing simulation of such foods as salami, as well as meats having traces of interlaced fat. The base product may have flavoring, coloring and texturizing ingredients added thereto to simulate loaf cheese and sliceable meat products. Although it is desirable to eliminate or minimize the saturated fat and cholesterol in the food products of my invention, it is possible to utilize animal fats such as butter fats in liquified form as the oil in the base product of my invention, with the resulting product closely simulating natural milk derived products, but because of the bulk of the cellulose fiber, having fewer calories per gram and obtaining the benefits of cellulose fiber in nutrition.

Further objects, features, and advantages of my invention will be apparent from the following detailed description illustrating preferred embodiments of a low calorie food base composition and simulated food products produced therefrom, and method of producing the same, exemplifying the principles of my invention.

DESCRIPTION OF THE PREFERRED EMBODIMENTS

As indicated above, it is desirable to provide a cellulose fiber fortified simulated food composition which has many of the attributes of natural foods in order to be attractive to the consumer, and which in its base form does not contribute substantially to the usable caloric intake. Such simulated food compositions must not only be palatable to persons who will consume them, but also must be physiologically compatible with the human digestive system.

It has been determined that the cellulosic fibers contained in natural foods contribute very little, if any available caloric value to humans, and it is generally assumed that humans are not capable of providing the enzymes and other digestive juices required to digest cellulose. However, since virtually all plant matter consumed by humans contains some cellulose, it is apparent that most naturally occurring cellulosic materials are not harmful to the human digestive tract. In fact, the "roughage" or bulk provided by the cellulosic materials and other indigestible materials is often necessary for proper human digestion. As discussed above, there is substantial evidence to suggest that non-nutritive fiber material is valuable in the human digestive process in minimizing the impact of various functional diseases such as cancer, heart disease, varicose veins, and diabetes.

Fibrous cellulose obtained from such natural materials as wood, cotton, grains, vegetable material and so forth may, under proper conditions and with proper treatment, be utilized as a major non-nutritive component of food substitutes and as a hygienic dietary additive to standard food products. This cellulose should preferably be in the form of separated cellulosic fibers, with substantially all of the binding material between the fibers, such as lignin and pectin, removed in order to provide a bland material which will not contribute substantially to the flavor of the final product. An example of a satisfactory cellulose fiber is wood pulp which has been digested by either the well-known sulphate or sulphite process to remove the binders, although similar fiber obtained by other processes is also satisfactory. The resulting cellulose fiber may be washed and cleansed to remove any traces of extraneous chemicals, and then mechanically ground to reduce the fibers down to sufficiently small size to provide adequate palatability. I have found that a cellulose particle size which averages 20 to 40 microns or less in length provides satisfactory palatability and mouth feel to a majority of human subjects. Average particle sizes greater than about 40 microns in length results in a product having a "gritty" mouth feel, which is unacceptable to most consumers.

One type of particulate fibrous cellulose satisfactory for use in my food product is obtained from the Brown Company of Berlin, New Hampshire under the trade name Solka-Floc BW-300. Such particulate fibrous cellulose, also known as powdered cellulose, is a mechanically disintegrated and purified cellulose generally obtained from primarily alpha cellulose derived from wood pulp. 99.5% of this material will pass through a 33 micron screen and 99.0% will pass through a 23 micron screen. The average fiber length is 21 microns and the average fiber width is 17 microns. The most satisfactory palatability of my food product is obtained with relatively fine powdered cellulose such as Solka-Floc BW-300, or any equivalent powdered cellulose, because the relatively small particle size of the cellulose fibers minimizes the gritty mouth feel of the insoluble cellulose, and also allows the cellulose fibers to be easily distributed within a water-gum-oil in gel suspension matrix.

The base product of my invention comprises a major portion of separated fibrous cellulose particles, an edible oil such as vegetable oil, one or more gums at least one of which is a cohesive gelling gum or agent, with the gums and oil both being placed in colloidal suspension in water to form a binding mixture which, upon addition and thorough dispersion of particulate fibrous cellulose, will hold the cellulose fibers in suspension in an infinite structural network upon setting up of the gel. Various flavorings, colorings and other additives may be added in order to obtain a food substitute product which simulates a natural solid consistency food. These mixed ingredients may also be heated and maintained at a high temperature to pasteurize the composition in accordance with customary pasteurization procedures. For example, I have determined that satisfactory pasteurization is obtained if the composition before gelling is maintained at 160° F. for 30 minutes. The composition may then be cooled, and maintained under conditions which will induce the particular gelling agent or agents chosen to set, for a period of time sufficient for the composition to attain a continuous cohesive gel structure. It may be noted that the caloric content of the overall resulting food substitute product is contributed almost entirely by the organic substances other than the cellulose fiber particles, and the nature of this caloric content can be controlled, for example, to minimize the content of saturated fat and cholesterol.

It is desired that the over-all cellulose fiber content of the final product on a "dry weight basis" (meaning as a percentage of all ingredients other than water) should be at least 10% to assure sufficient fiber content to provide the benefits of my invention, and not more than about 85% to allow for sufficient binding mixture and flavor, color, texture and other additives to permit simulation of natural foods. The edible oil content should provide a significant oleaginous character to the composition, the minimum oil content of the following examples being about 12.5% on a dry basis (Example II), and may be as great as 60% where it is desired to simulate certain high fat natural foods such as cheese or sausage. Of course, where it is desired to have a simulated food of very low caloric content, the oil content will normally be less than about 30%. A combination of gums in addition to a cohesive gelling gum may be selected for the specific known properties of each such gum, in total amounts of from about 0.1% to 5% on a dry weight bases, to provide the desired viscosity within the binding mixture as well as palatability.

A class of gums, referred to herein as "cohesive gelling agents or gums", are provided in amounts from 1% to 50% to provide a continuous cohesive gel structure support for the particulate fibrous cellulose. The water component of the composition will normally be sufficient to provide at least 40% water in the final simulated food product.

The following examples are provided as illustrative of the product and process of my invention, but it is understood that my invention is not limited to the specific details thereof.

EXAMPLE I

One kilogram of low calorie imitation chedder cheese loaf composition having a cohesive structure was prepared having the following ingredients.

| Ingredient | Amount | Calories Per Gram | Total Calories |
|---|---|---|---|
| Water | 503.46 gm. | 0.0 | 0.0 |
| Locust Bean Gum | 4.75 gm. | 4.0 | 19.0 |
| Guar Gum | 4.75 gm. | 4.0 | 19.0 |
| Carrageenan, Iota Type | 0.95 gm. | 4.0 | 3.8 |
| Gelatin, 175° Bloom | 60.0 gm. | 3.35 | 201.0 |
| Sorbitol 70% Solution | 41.0 gm. | 2.8 | 114.8 |
| Salt (Sodium Chloride) | 23.5 gm. | 0.0 | 0.0 |
| Potassium Sorbate (Sorbistat K) | 0.85 gm. | 0.0 | 0.0 |
| Sodium Benzoate | 0.42 | 0.0 | 0.0 |
| Citric Acid, Hydrous | 1.2 gm. | 4.0 | 4.8 |
| Yellow Color No. 5, 10% Solution | 0.2 gm. | 0.0 | 0.0 |
| Yellow color No. 6, 10% Solution | 0.7 gm. | 0.0 | 0.0 |
| Artificial Milk Flavor (Norda) | 0.3 gm. | 4.0 | 1.2 |
| Mustard, Double Fine | 0.42 gm. | 4.0 | 1.68 |
| Worcestershire Sauce | 0.78 gm. | 4.0 | 3.12 |
| Imitation Cheddar Cheese Flavor | 0.6 gm. | 4.0 | 2.4 |
| Corn Oil | 73.7 gm. | 9.0 | 663.30 |
| Polyoxyethylene (20) Sorbitan Monostearate (Tween 60—Atlas ICI America) | 3.5 gm. | 9.0 | 31.5 |
| Separated and Purified Cellulose Fibers (Brown Company Solka-Floc BW-300) | 278.92 gm. | 0.0 | 0.0 |
| | 1000.00 gm. | | 1065.60 cal. |

A first gum mucilage was prepared by adding the 4.75 gm. of locust bean gum in-stream fashion to 100 gm. of water at 175° F. in a Waring blendor set at first speed to create a vortex. The locust bean gum was mixed for three minutes, and the resulting mucilage was held in a hot water bath at 175° F. for ten minutes.

The 4.75 gm. of guar gum was added in-stream fashion to 173.46 gm. of water at 100° F. in a Waring blendor set at first speed to create a vortex. The guar gum was mixed in for three minutes, and the resulting mucilage was held at 100° F. to await further processing.

The 0.95 gm. of carrageenan was added in-stream fashion to 110.0 gm. of water at 120° F. in a Waring blendor set at first speed to create a vortex. After three minutes of mixing, the resulting gum mucilage was held at 120° F.

The 60 gm. of gelatin, a cohesive gelling agent, was added to 120.0 gm. of water at approximately 60° F. in a metal mixing container. This container was then placed in a water bath at 120° F. for 1 hour to cause the gelatin to dissolve in the water.

The 73.7 gm. of corn oil and the 3.5 gm. of polyoxyethylene (20) sorbitan monostearate were heated and mixed together at approximately 130° F. The above listed gum mucilages were added together and mixed in a Waring blendor for two minutes, and all of the above listed ingredients except the cellulose fibers were added thereto and mixed in on high speed for three minutes.

The cellulose fibers were placed in the bowl of a small Hobart mixer, and the previously mixed ingredients were added therein and mixed for three minutes on high speed with a beater.

The resulting product was placed in a polyethylene sheet liner and then into a block form with a slight amount of pressure applied thereto.

The product was allowed to stand for six hours at room temperature (70° F.) to allow the gelatin to form a cohesive gel structure, and then was cut into small blocks. The cheese loaf product that resulted had a cohesive solid consistency, with a texture and mouth feel similar to that of processed natural cheese. The pH of the cheese loaf was approximately 4.5, with the product having a caloric value of 1.065 calories per gram compared to about 3.7 calories per gram for regular cheese loaf. The cellulose fiber comprised 56.17% of all non-water ingredients, i.e., on a dry weight basis. The non-gelling agent hydrocolloids and the oil comprised respectively 2.1% and 14.84% of the non-water ingredients. The gelatin comprised 6% of the total weight of all ingredients, including water, and 12.08% of the non-water ingredients.

EXAMPLE II

One kilogram of low calorie imitation ham loaf was prepared having the following ingredients.

| Ingredient | Amount | Calories Per Gram | Total Calories |
|---|---|---|---|
| Water | 558.50 gm. | 0.0 | 0.0 |
| Guar gum | 1.65 gm. | 4.0 | 6.6 |
| Carrageenan, Iota Type | 0.65 gm. | 4.0 | 2.6 |
| Gelatin, 225° Bloom | 130.00 gm. | 3.35 | 435.5 |
| Sodium Alginate | 8.20 gm. | 4.0 | 32.8 |
| Sodium Hexametaphosphate | 1.00 gm. | 0.0 | 0.0 |
| Sorbitol 70% Solution | 25.40 gm. | 2.8 | 71.12 |
| Salt (Sodium Chloride) | 28.00 gm. | 0.0 | 0.0 |
| Potassium Sorbate (Sorbistat K) | 0.80 gm. | 0.0 | 0.0 |
| Sodium Benzoate | 0.40 gm. | 0.0 | 0.0 |
| Citric Acid, Hydrous 50% Solution | 3.60 gm. | 2.0 | 7.2 |
| Monosodium Glutamate | 1.50 gm. | 0.0 | 0.0 |
| Worcestershire Sauce | 2.50 gm. | 4.0 | 10.0 |
| Natural Bacon Flavor (NORDA) | 10.00 gm. | 4.0 | 40.00 |
| Smoke Flavor (NORDA) | 0.20 gm. | 4.0 | 0.8 |
| Instant Caramel Color | 1.00 gm. | 4.0 | 4.0 |
| Corn Oil | 55.00 gm. | 9.0 | 495.0 |
| Polyoxyethylene (20) Sorbitan Monostearate (Tween 60—Atlas ICI America) | 0.80 gm. | 9.0 | 7.2 |
| Calcium Monophosphate | 0.60 gm. | 0.0 | 0.0 |
| Replacement Red Shade #2 10% Solution | 0.20 gm. | 0.0 | 0.0 |
| Separated and Purified Cellulose Fibers (Brown Company Solka-Floc BW-300) | 170.00 gm. | 0.0 | 0.0 |
| | 1000.00 gm. | | 1112.82 cal. |

A first gum mucilage was prepared by adding the 1.65 gm. of guar gum in-stream fashion to 40.00 gm. of water at 100° F. in a Waring blendor set at first speed to create a vortex. The gum was mixed for 3 minutes and held at 100° F. to await further processing.

The 0.65 gm. of carrageenan was added in-stream fashion to 40.00 gm. of water at 120° F. in a Waring blendor set at first speed to create a vortex. After mixing for 3 minutes, the mucilage was held at 120° F.

The 130.0 gm. of gelatin, provided as a gelling agent, was added to 205.0 gm. of water at approximately 60° F. in a mixing container. The mixing container was then placed in a water bath at a temperature of 120° F. for 1 hour to dissolve or disperse the gelatin in the water.

The 8.2 gm. of sodium alginate was then added in-stream fashion to 270.0 gm. of water at 175° F. in a Waring blendor set at first speed to create a vortex, and mixed for 3 minutes. The 1.0 gm. of sodium hexametaphosphate was then added in-stream fashion and mixed in for one minute.

The gum mucilages as prepared above were added together in a Waring blendor and mixed for 2 minutes, and the following ingredients were then added to the above mixture and mixed in for 3 minutes:

| Ingredient | Amount |
|---|---|
| Sorbitol 70% Solution | 25.40 gm. |
| Salt | 28.00 gm. |
| Potassium sorbate | 0.80 gm. |
| Sodium Benzoate | 0.40 gm. |
| Monosodium Glutamate | 1.50 gm. |
| Worcestershire Sauce | 2.50 gm. |
| Natural Bacon Flavor | 10.00 gm. |
| Instant Caramel Color | 0.35 gm. |

The 55.0 gm. of corn oil, the polyoxyethylene (20) sorbitan monostearate, and the smoke flavor were heated to 130° F. and mixed together, and then added to the above mixture, with the total mixed together for 3 minutes in the Waring blendor.

The cellulose fibers were placed in the bowl of a Hobart mixer, and the previously mixed ingredients were added therein and mixed for five minutes on high speed with a beater.

The 0.60 gm. of calcium monophosphate and 3.5 gm. of water were mixed together and added to the above mixture, with all of the above ingredients then being mixed together for one minute. 3.6 gm. of the 50% citric acid solution was added thereto and mixed in with the mass for one minute.

150 gm. of the above mixture was then immediately removed and set out in thin strips on a polyethylene sheet at 70° F. to cool. To the remaining portion of the mixture was added the 0.20 gm. of replacement red shade No. 2, 10% solution and 0.65 gm. of instant caramel color, with the total being mixed to uniformly disperse the color.

A portion of the red colored product in a plastic state was spread thinly into a polyethylene lined baking pan. Several strips of the white colored product was placed on the layer of red product in the baking pan. A second thin layer of plastic red colored product was placed over the white strips, and additional white strips were then layed over the second layer of red product. This procedure was repeated until a block substantially filling the baking pan was formed. The block was maintained in the pan at room temperature (70° F.) for approximately 6 hours, with a slight amount of pressure being applied to the top of the block during this time.

The resulting simulated ham loaf product had a cohesive solid gel structure, with striations of white product distributed through the greater proportion of red color product to simulate fat in ham. The pH of the simulated ham loaf product was approximately 4.5, with a caloric value of 1.113 calories per gram compared with about 3 calories per gram for ham. The fibrous cellulose comprised 38.5% of the non-water ingredients, the non-gelling agent hydrocolloids comprised 0.52% of the total non-water ingredients, and the gelatin and sodium alginate comprised 31.3% of the non-water ingredients.

The corn oil comprised approximately 12.5% of the non-water ingredients, calculated as follows:

$$\begin{aligned}\text{\% of corn oil in non-water ingredients} &= \frac{\text{weight of corn oil}}{\text{weight of non-water ingredients}} \times 100\\ &= \frac{55 \text{ gm}}{441.5 \text{ gm}} \times 100\\ &= 12.5\% \text{ (rounded off to the nearest tenth of a percent.)}\end{aligned}$$

EXAMPLE III

One kilogram of low calorie imitation cocoa candy loaf composition having a solid structure was prepared having the following ingredients.

| Ingredient | Amount | Calories Per Gram | Total Calories |
|---|---|---|---|
| Water | 466.8 gm. | 0.0 | 0.0 |
| Locust Bean Gum | 2.3 gm. | 4.0 | 9.2 |
| Guar Gum | 2.3 gm. | 4.0 | 9.2 |
| Carrageenan, Iota Type | 0.9 gm. | 4.0 | 3.6 |
| Gelatin 225° Bloom | 46.4 gm. | 3.35 | 155.4 |
| Sodium Cyclamate | 13.0 gm. | 0.0 | 0.0 |
| Sorbitol 70% Solution | 38.0 gm. | 2.8 | 106.4 |
| Salt (Sodium Chloride) | 11.0 gm. | 0.0 | 0.0 |
| Potassium Sorbate (Sorbistat K) | 0.79 gm. | 0.0 | 0.0 |
| Sodium Benzoate | 0.39 gm. | 0.0 | 0.0 |
| Citric Acid, Hydrous | 1.1 gm. | 4.0 | 4.4 |
| Artificial Milk Flavor (Norda) | 0.4 gm. | 4.0 | 1.6 |
| Aritficial Butter Flavor (Firmenich) | 0.04 gm. | 4.0 | 0.16 |
| Chocolate Flavor (Monsanto) | 0.5 gm. | 9.0 | 4.5 |
| Cocoa Powder (Wessanen Type N) | 56.5 gm. | 2.6 | 146.9 |
| Corn Oil | 92.7 gm. | 9.0 | 834.3 |
| Polyoxyethylene (20) Sorbitan Monostearate (Tween 60—Atlas ICI America) | 4.6 gm. | 9.0 | 41.4 |
| Separated and Purified Cellulose Fibers (Brown Company Solka—Floc BW-300) | 262.28 gm. | 0.0 | 0.0 |
|  | 1000.00 gm. |  | 1317.06 Cal. |

A first gum mucilage was prepared by adding the 2.3 gm. of locust bean gum in-stream fashion to 92.7 gm. of water at 170° F. in a Waring blendor set at first speed to create a vortex. The locust bean gum was mixed in for three minutes and the resulting mucilage held in a hot water bath at 175° F. for 10 minutes.

The 2.3 gm. of guar gum was added in-stream fashion to 160.8 gm. of water at 100° F. in a Waring blendor set at first speed to create a vortex. After mixing for 3 minutes the resulting mucilage was held at 100° F. for further processing.

The 0.9 gm. of carrageenan was added in-stream fashion to 102.0 gm. of water at 120° F. in a Waring blendor set at first speed to create a vortex. After 3 minutes of mixing the gum mucilage was held at 120° F. for further processing.

The 46.4 gm. of gelatin used as a cohesive gelling agent, was added to and mixed in with 111.3 gm. of water at approximately 60° F. in a metal mixing container, and the container was then placed in a water bath at 120° F. for 1 hour to dissolve the gelatin.

The 92.7 gm. of corn oil and the 4.6 gm. of polyoxyethylene (20) sorbitan monostearate were heated and mixed together at approximately 130° F. The locust bean, guar gum, and carrageenan gum mucilages were added together and mixed in a Waring blender for two minutes. The heated corn oil and Tween 60, and all of the other above ingredients except the cellulose fibers and the cocoa powder were added in to the gum mucilage mixtures and mixed in at high speed of the Waring blendor for three minutes.

The 262.28 gm. of cellulose fibers and the 56.5 gm. of cocoa powder were placed in the bowl of a small Hobart mixer and all of the other previously mixed ingredients were added thereto and mixed in for 5 minutes on high speed with a beater.

The final product was spread onto a polyethylene sheet on a cold table and the top of the product was covered with another polyethylene sheet. After setting for 6 hours at room temperature (70° F.), the product had attained a cohesive gel structure and was firm enough to be cut into candy-sized cubes by a knife. The candy cubes were wrapped in polyethylene film impermeable to moisture to enhance the stability of the candy.

The candy loaf product had a cohesive solid consistency similar to that of cocoa fudge. The pH of the candy loaf was approximately 4.8, with the product having a caloric value of 1.317 calories per gram as compared to a caloric value of approximately 4 calories per gram for regular chocolate candies. The cellulose fiber comprised 49.19% of all non-water ingredients. The non-gelling agent hydrocolloids and the corn oil comprised respectively 1.03% and 17.39% of the non-water ingredients. The gelatin comprised 4.64% of the total weight of all ingredients including water, and 8.7% of the non-water ingredients.

EXAMPLE IV

One kilogram of low calorie imitation lemon flavor candy loaf composition having a solid structure was prepared having the following ingredients.

| Ingredient | Amount | Calories Per Gram | Total Calories |
|---|---|---|---|
| Water | 511.93 gm. | 0.0 | 0.0 |
| Locust Bean Gum | 2.54 gm. | 4.0 | 10.16 |
| Guar Gum | 2.54 gm. | 4.0 | 10.16 |
| Carrageenan, Iota Type | 0.96 gm. | 4.0 | 3.84 |
| Gelatin, 225° Bloom | 26.43 gm. | 3.35 | 88.54 |
| Sodium Cyclamate | 16.27 gm. | 0.0 | 0.0 |
| Sorbitol 70% Solution | 41.70 gm. | 2.8 | 116.76 |
| Potassium Sorbate (Sorbistat K) | 0.86 gm. | 0.0 | 0.0 |
| Sodium Benzoate | 0.42 gm. | 0.0 | 0.0 |
| Citric Acid, Hydrous | 2.23 gm. | 4.0 | 8.92 |
| Artificial Milk Flavor (Norda) | 0.4 gm. | 4.0 | 1.6 |
| Artificial Butter Flavor (Firmenich) | 0.04 gm. | 4.0 | 0.16 |
| Yellow Color No. 5, 10% Solution | 0.30 gm. | 0.0 | 0.0 |
| Lemon TruType—Bush, Boake & Allen | 0.81 gm. | 4.0 | 3.24 |
| Corn Oil | 101.68 gm. | 9.0 | 915.12 |
| Polyoxyethylene (20) Sorbitan Monostearate (Tween 60—Atlas ICI America) | 5.08 gm. | 9.0 | 45.72 |
| Sepaarated and Purified Cellulose Fibers (Brown Company Solka—Floc BW-300) | 285.81 gm. | 0.0 | 0.0 |
| | 1000.0 gm. | | 1204.22 Cal. |

The 2.54 gm. of locust bean gum was added in-stream fashion to 101.68 gm. of water at 175° F. in a Waring blendor set at first speed to create a vortex. After mixing for three minutes, the resulting mucilage was held in a hot water bath at 175° F. for 10 minutes.

The 2.54 gm. of guar gum was added in-stream fashion to 176.38 gm. of water at 100° F. in a Waring blendor set at first speed to create a vortex. After mixing for 3 minutes, the resulting mucilage was held at 100° F. to await further processing.

The 0.96 gm. of carrageenan was added in-stream fashion to 101.85 gm. of water at 120° F. in a Waring blendor set at first speed to create a vortex. This mixture was also mixed for 3 minutes and thereafter held at 120° F.

The 26.43 gm. of gelatin was mixed in with 122.02 gm. of water at approximately 60° F. in a small mixing container, and the mixing container was then placed in a water bath at 120° F. for one hour to dissolve the gelatin.

The 101.68 gm. of corn oil and the 5.08 gm. of Tween 60 were heated and mixed together at approximately 130° F. The locust bean gum, guar gum, and carrageenan mucilages were added together and mixed in a Waring blendor for two minutes, and the corn oil--Tween 60 mixture and all of the other above listed ingredients except the cellulose fibers were added to the gum mucilage mixture and mixed in on high speed for three minutes.

The cellulose fibers were placed in the bowl of a small Hobart mixer and the other mixed ingredients were added therein and mixed together with a beater on high speed for five minutes.

After mixing, the ingredients were spread onto a polyethylene sheet on a cold table, and the top was covered with another polyethylene sheet. After setting for 6 hours at room temperature (70° F.), the product had attained a gel structure and was firm enough to be cut into suitable sized cubes by a knife.

The resulting loaf candy had a cohesive solid texture similar to that of natural fondant candies. The pH of the lemon flavored candy was approximately 4.5, with a caloric value of 1.201 calories per gram as compared to about 4 calories per gram for ordinary sugar based candies of this type. The cellulose fiber comprises 58.56% of all non-water ingredients, the non-gelling agent hydrocolloids comprised 1.24% of all non-water ingredients, and the corn oil comprised 20.83% of all non-water ingredients. The gelatin comprised 2.643% of all ingredients including water, and 5.42% of the non-water ingredients.

EXAMPLE V

A kilogram of pasteurized low calorie imitation lemon flavor candied loaf composition, having a solid cohesive structure, was prepared having the following ingredients.

| Ingredient | Amount | Calories Per Gram | Total Calories |
|---|---|---|---|
| Water | 457.0 gm. | 0.0 | 0.0 |
| Locust Bean Gum | 2.5 gm. | 4.0 | 10.0 |
| Guar Gum | 2.5 gm. | 4.0 | 10.0 |
| Carrageenan | 0.9 gm. | 4.0 | 3.6 |
| Gelatin, 225° Bloom | 118.3 | 3.35 | 396.31 |
| Sodium Cyclamate | 15.75 gm. | 0.0 | 0.0 |
| Saccharin | 0.78 gm. | 0.0 | 0.0 |
| Sorbitol 70% Solution | 40.4 gm. | 2.8 | 113.12 |
| Glucona Delta Lactone | 10.0 gm. | 4.0 | 40.0 |
| Artificial Milk Flavor (Norda) | 0.4 gm. | 4.0 | 1.6 |
| Artificial Butter Flavor (Firmenich) | 0.04 gm. | 4.0 | 0.16 |
| Yellow Color No. 5, 10% Solution | 0.3 gm. | 0.0 | 0.0 |
| Lemon TruType | 1.23 gm. | 4.0 | 4.92 |
| Corn Oil | 98.6 gm. | 9.0 | 887.40 |
| Polyoxyethylene (20) Sorbitan Monostearate (Tween 60—Atlas ICI Amerca) | 5.0 | 9.0 | 45.0 |
| Separated and Purified Cellulose Fibers (Brown Company Solka—Floc BW-300 | 246.3 gm. | 0.0 | 0.0 |
| | 1000.00 gm. | | 1512.11 Cal. |

The 2.5 gm. of locust bean gum was added in-stream fashion to 79.0 gm. of water at 175° F. in a Waring blendor set at first speed to create a vortex. After mixing for three minutes, the resulting mucilage was held in a hot water bath at 175° F. for 10 minutes. The 2.5 gm. of guar gum was added in-stream fashion to 118.0 gm. of water at 100° F. in a Waring blendor set at first speed to create a vortex. After mixing for three minutes, the resulting mucilage was held at 100° F. to await further processing. The 0.9 gm. of carrageenan was added in-stream fashion to 102 gm. of water at 120° F. in a Waring blender set at first speed to create a vortex. This gum mucilage was also mixed for three minutes and thereafter held at 120° F.

The 118.3 gm. of gelatin was mixed in with 158.0 gm. of water at approximately 60° F. in a small mixing container, and the mixing container was then placed in a water bath at 120° F. for 1 hour to dissolve the gelatin.

The 98.6 gm. of corn oil and the 5.0 gm. of Tween 60 were heated and mixed together at approximately 130° F. The locust bean gum, guar gum, and carrageenan mucilages were added together and mixed in a Waring blendor for two minutes, the corn oil, Tween 60, mixture was added thereto, and all of the other above listed ingredients except the glucona delta lactone and the cellulose fibers were added to the gum mucilage mixture and mixed in at high speed for three minutes.

The cellulose fibers were placed in a bowl of a Hobart mixer and the above mixed ingredients were added therein and mixed together with a beater on high speed for five minutes. The glucona delta lactone was then added thereto and mixed in for one minute. Use of glucona delta lactone allows the pH of the resulting product to be adjusted, but because of its slow acting acidic characteristic, it does not substantially interfere with the formation of the gel.

The above mixed product was placed in heat resistant plastic bags, and the bags were placed in a hot water bath at 165° F. for pasteurization. The temperature of the product in each bag was measured, and the product was maintained within the bath for 30 minutes from the time that the temperature at the center of the product was 160° F. The product was then extruded through a sterilized auger type extruder into cylindrically shaped ropes which were passed into a sterilized cold tunnel at a temperature of 50° F.

After passing through the extruder, the rope like portions of the product were maintained at room temperature for a period of six hours, and the ropes were then cut into pieces. The resulting loaf type candy had a cohesive solid texture with a slight chewiness to the taste. The pH of the resulting candy loafs was approximately 4.3 with a caloric value of 1.512 calories per gram as compared to about 4 calories per gram for sugar based candies. The cellulose fiber comprised 38.30% of all non-water ingredients, the non-gelling agent hydrocolloids comprised 0.92% of all non-water ingredients, and the corn oil comprised 15.33% of all non-water ingredients. The gelatin comprised 11.83% of all ingredients including water, and 18.40% of the non-water ingredients.

The fundamental ingredients required to produce a fibrous food composition with a gel structure in accordance with our invention, having a substantial proportion of non-caloric cellulose fiber, are the particulate cellulose fiber itself, water, edible oil, and at least one gelling agent, with the optional addition of other non-gelling gums. These ingredients have been referred to herein as the "base ingredients". As described above, cellulose fiber utilized may be any fibrous particulate material of sufficiently small fiber size to be utilized in food products.

The water provides a non-caloric base for the product which gives the product softness and spreadability. Clean tap water may be used, with adjustments to the final pH of the product being made as desired. Pasteurization and bacteriological control agents may be utilized as necessary to provide satisfactory stability.

The cohesive gelling gum and any desired additional gums render the relatively rough natural fibrous cellulose particle smooth to the palate. The gum or gum combination acts secondarily to help stabilize the oil in water emulsion when oils are added to the basic product, and coincidentally functions as a whipping agent, as an inhibitor of synersis, and to a certain extent simulates an oleaginous texture which is desirable from the standpoint of palatability with respect to simulated foods of the nature of cheeses, salami, and related types of foods. A number of other gums not used as gelling agents may be used in the product of my invention to provide these desirable functions, including by way of example, but not limitation, gum ghatti, gum karaya, gum acacia, gum tragacanth, psyllium seed gum, quince seed gum, high and low methoxylated pectins, arabinogalactan, agar, furcellaran, alginates, modified and pregelatinized starches, dextran, xanthan and related microbial gums, gelatin, cellulose gum derivatives, and synthetic hydrocolloids. The combination of various gums is not essential, but is often desirable since each type of gum provides different qualities of palatability and mouth feel to the final product. A particular combination of gums may thus be selected to obtain better mouth feel and texture than may be obtained with any single type of gum. Each gum in a gum combination may be hydrated separately or the gums may be added in-stream fashion together with water in a blendor, and thoroughly mixed to provide substantially complete hydration of all gums.

In addition, one or more cohesive gel-forming hydrocolloids (gums) are incorporated in the base product in generally somewhat larger proportions as cohesive gelling agents to cause the composition to "set up" and support the cellulose particles in a continuous cohesive gel structure which, for example, may produce a loaf-like product with sliceability. As previously indicated, such cohesive gelling agents may be used in substantial percentages up to 50% of the dry weight of the simulated product. Such cohesive gelling agents may include, by way of representation and not limitation, in addition to gelatin, alginates, agar, carrageenan, high and low methoxylated pectins, modified and pre-gelatinized starches, furcellaran, albumen, modified casein, modified soy protein, and gum acacia. All such gel forming hydrocolloids including gelatin are denoted herein as "gums" because of their similar ability to be dispersed in water to form viscous solutions or dispersions. See e.g., M. Glicksman, *Gum Technology in the Food Industry,* Academic Press, New York and London, 1969. As noted in Glicksman, Ibid. at p. 23, the gelation of such gelling gum or gums in mixture with the other ingredients of my product may be obtained by providing gel inducing conditions to the mixture, such as addition of a non-solvent, evaporation of solvent, the addition of a cross linking agent, reducing the solubility of the solute by chemical reaction, changing the temperature, and adjusting the pH. Such techniques are well known in the food industry, and may be utilized as desired to obtain the required gel structure of the fibrous food products in accordance with my invention.

The oil provides a smooth flavor sensation and reduces the gummy texture inherent in the gum solution. It also permits the incorporation of air when used in conjunction with an emulsifier, such as polyoxyethylene (20) sorbitan monostearate, which it solubilizes, thus allowing simulation of the density and character of the desired product. Other equivalent types of oil in addition to corn oil which may be utilized are safflower oil, cotton seed oil, peanut oil, sesame oil, soy bean oil, sunflower seed oil, coconut oil, rape oil, cocoa butter, palm oil, palm kernel oil, tucum oil, babassu oil and other vegetable oils, including chemical modifications thereof, with the addition of anti-oxidants as necessary. Hydrogenated fats and oils may also be utilized by heating the solid fats to a liquid before combining with the other ingredients. However, the amounts of saturated fats and all animal fats in the final product are preferably minimized because of the desirability of limiting the intake of such fats by humans.

The other ingredients listed in the examples given above are provided for the purpose of flavoring and coloring, to enhance physical and biological stability, and to provide a product texture and form as similar as possible to the food product being simulated. Thus these ingredients are not critical to our invention, but are desirable to provide a fibrous solid consistency simulated food product which is as close in flavor and texture to known food products as possible, and which is palatable to the consumer. The function of these additional ingredients, and examples of alternative products having similar functions are listed below.

The polysorbate 60 or Tween 60 (polyoxyethylene (20) sorbitan monostearate) promote and stabilize an oil in water emulsion and facilitate the incorporation of air into the overall mixture. Any emulsifying agent that promotes an oil in water emulsion may be utilized, such as lecithin, decaglycerol distearate, decaglycerol monolaurate, ethoxylated mono- and di-glycerides, polyethylene glycol, lactylil stearate, polyoxyethylene (20) sorbitan tri-stearate, polyoxyethylene (20) sorbitan mono-oleate, sorbitan monostearate, propylene glycol, and glycerol monostearate.

The sorbitol 70% solution provides sweetness and humectancy, and also provides a certain amount of preserving action. Other ingredients providing these functions to a substantial extent are glycerine, propylene glycol, dextrose, sucrose, corn syrup (dry or wet), invert sugar, fructose, levulose, lactose, maltose, mannatol and xylose. Artificial sweeteners such as sodium cyclamate and sodium saccharin may also be used. The salt (sodium chloride) is provided for the purpose of flavor and also has some incidental preserving action. Potassium chloride may alternatively be utilized in products for those persons whose intake of sodium chloride must be limited.

The potassium sorbate (sorbistat K) and the sodium benzoate are both utilized as microbial inhibitors. Other feasible microbial inhibitors are sorbic acid, sodium sorbate, benzoic acid, methyl and propyl ester of P-hydroxybenzoic acid, and propionic acid and its salts. Pasteurization can be utilized to inactivate pathogenic organisms. Sterilization and aseptic packaging may also be used as appropriate. If the product is to be handled and stored without refrigeration, the pH of the final product nay be maintained at 4.6 or less.

The citric acid acts as a flavoring agent and also provides inhibition of microbial growth since it lowers the pH to safer levels, and also permits the other microbial inhibitors to be more effective. Anhydrous citric acid could also be utilized, as well as other acidic agents including lactic acid, acetic acid, malic acid, fumaric acid, adipic acid, tartaric acid, glucono delta lactone, and potassium hydrogen tartrate. Fruit juices may be used to partially or completely replace the water while providing flavor and acidity.

The yellow color No. 5, 10% solution and the yellow color No. 6, 10% solution are provided to simulate the color of cheese. Various types of annato may be utilized to similate such colors, and it is apparent that other food colorings would be appropriate where other products are being simulated.

It is apparent that the flavoring materials will depend on the particular product being simulated, and can be added in varying amounts to satisfy the particular taste as desired.

It is understood that my invention is not confined to the particular embodiments illustrated and described herein, but embraces all such modified forms thereof as may come within the scope of the following claims.

I claim:

1. A fibrous food composition for simulated food products consisting essentially of:
    (a) between about 10% and 85% of the composition on a dry weight basis comprising particulate fibrous cellulose having an average particle length of not more than about 40 microns;
    (b) a mixture of edible oil and edible gum in water, the edible oil comprising between about 12.5% and 60% of the composition on a dry weight basis and the edible gum comprising between about 0.1% and 5% of the composition on a dry weight basis; and (c) a cohesive gelling agent uniformly mixed with said mixture of edible oil and edible gum in water and said particulate fibrous cellulose, said cohesive gelling agent being present in an amount sufficient to provide a cohesive gel structure which supports the mixture of edible oil and edible gum in water and the particulate fibrous cellulose.

2. The fibrous food composition of claim 1 wherein the cohesive gelling agent comprises between about 1% and 50% of the composition on a dry weight basis.

3. The composition of claim 1 wherein the cohesive gelling agent is selected from the group consisting of gelatin, alginates, agar, carrageenan, furcelleran, methoxylated pectin, modified starch, pre-gelatinized starch, albumen, and gum acacia.

4. The composition of claim 1 wherein the fibrous cellulose comprises refined powdered cellulose derived from wood pulp.

5. The composition of claim 1 wherein the edible gum includes at least one gum selected from the group consisting of carrageenan, carboxymethylcellulose, locust bean gum, guar gum, gum acacia, gum ghatti, gum karaya, gum tragacanth, psyllium seed gum, quince seed gum, methoxylated pectin, aribinogalactan, agar, furcelleran, alginates, modified starch, pre-gelatinized starch, dextran, xanthan, cellulose gum derivatives, and synthetic hydrocolloids.

6. The composition of claim 1 wherein the edible oil is a vegetable oil.

7. The composition of claim 1 including an emulsifying agent uniformly intermixed therein in an amount sufficient to stabilize an emulsion of the oil in the mixture of oil, gum, and water.

8. The composition of claim 1 wherein the emulsifier includes at least one emulsifier selected from the group consisting of polyoxyethylene (20) sorbitan monostearate, lecithin, decaglycerol distearate, decaglycerol monolaurate, ethoxylated monoglyceride, ethoxylated diglyceride, polyethylene glycol, lactylil stearate, polyoxyethylene (20) sorbitan tri-stearate, polyoxyethylene (20) sorbitan monoleate, sorbitan monostearate, propylene glycol, and glycerol monostearate.

9. The composition of claim 1 wherein the edible oil is selected from the group consisting of corn oil, safflower oil, cotton seed oil, peanut oil, sesame seed oil, soy bean oil, coconut oil, rape oil, cocoa butter, palm oil, palm kernel oil, tucum oil, babassu oil, and sunflower seed oil.

10. The composition of claim 1 wherein the edible oil is selected from the group consisting of hydrogenated oil and hydrogenated fat.

11. The composition of claim 1 including an acid pH-modifying substance in the composition in an amount sufficient to lower the pH of the composition to a value of not more than 4.6.

12. The composition of claim 1 wherein the water comprises at least 40% by weight of the final composition.

13. The composition of claim 1 including at least one coloring substance to simulate a natural food color in the composition.

14. The composition of claim 1 including at least one flavoring substance to simulate a natural food flavor in the composition.

15. A process for producing a fibrous food composition for simulated food products, consisting essentially of the steps of:

(a) mixing at least one edible gum, an edible oil, a cohesive gelling agent, and water, the edible oil comprising between about 12.5% and 60% and the edible gum comprising between about 0.1% and 5% of the composition on a dry weight basis, and the cohesive gelling agent comprising an amount sufficient to provide a cohesive gel structure which will support the edible oil, edible gum, water and other ingredients when subjected to gel inducing conditions;

(b) mixing particulate fibrous cellulose having an average particle length of not more than about 40 microns, in an amount between about 10% and 85% of the composition on a dry weight basis, with the edible oil, edible gum, cohesive gelling agent and water mixture to form a fibrous food composition with the fibrous cellulose particles being uniformly distributed throughout the composition; and (c) providing gel inducing conditions to the fibrous food composition for a period of time sufficient for said gelling agent to set such that the fibrous food composition attains a cohesive gel structure.

16. The process of claim 15 wherein the cohesive gelling agent is selected from the group consisting of gelatin, alginate, agar, carrageenan, furcelleran, methoxylated pectin, modified starch, pre-gelatinized starch, albumen, and gum acacia.

17. The process of claim 15 including the additional step of adding an acid pH-modifying substance to the composition in an amount sufficient to adjust the pH to a value of not more than 4.6.

18. The process of claim 15 wherein the edible gum includes at least one selected from the group consisting of carrageenan, carboxymethylcellulose, locust bean gum, guar gum, gum acacia, gum arabic, gum ghatti, gum karaya, gum tragacanth, psyllium seed gum, quince seed gum, methoxylated pectins, aribinogalactan, agar, furcellaran, alginates, modified starch, pre-gelatinized starch, dextran, xanthan, gelatin, cellulose gum derivatives, and synthetic hydrocolloids.

19. The process of claim 15 wherein the edible oil is vegetable oil.

20. The process of claim 15 wherein before the step of mixing the edible oil with the edible gum, cohesive gelling agent and water, the edible oil is mixed with at least one emulsifier at a temperature sufficient to completely melt the oil and emulsifier mass.

21. The process of claim 20 wherein the emulsifier is at least one selected from the group consisting of polyoxyethylene (20) sorbitan monostearate, lecithin, decaglycerol distearate, decaglycerol monolaurate, ethoxylated mono- and di-glycerides, polyethylene glycol and lactylil stearate, polyoxyethylene (20) sorbitan tri-stearate polyoxyethylene (20) sorbitan mono-oleate, sorbitan monostearate, propylene glycol, and glycerol monostearate.

22. The process of claim 15 wherein the edible oil is selected from the group consisting of corn oil, safflower oil, cotton seed oil, peanut oil, sesame seed oil, soy bean oil, rape oil, cocoa butter, palm oil, palm kernel oil, tucum oil, babassu oil, and sunflower seed oil.

23. The process of claim 15 wherein the edible oil is selected from the group consisting of hydrogenated oil and hydrogenated fat, and is heated to liquid phase.

24. The process of claim 15 wherein the fibrous cellulose comprises refined powdered cellulose derived from wood pulp.

25. The process of claim 15 wherein the water comprises at least 40% by weight of the final composition.

26. The process of claim 15 wherein the cohesive gelling agent comprises between about 1% and 50% of the composition on a dry weight basis.

27. The process of claim 15 wherein at least one coloring substance is added to the mixture of gum, oil, gelling agent and water to simulate a natural food color in the composition.

28. The process of claim 15 wherein at least one flavoring substance is added to the mixture of gum, oil, gelling agent and water to simulate a natural food flavor in the composition.

29. The process of claim 15 wherein before the step of providing gel inducing conditions to the fibrous food composition, the composition is heat treated at sufficient temperature and for sufficient time to pasteurize the mass of the composition.

* * * * *